Patented Dec. 20, 1938

2,140,536

UNITED STATES PATENT OFFICE 2,140,536

AZO COMPOUNDS AND PROCESS FOR DYEING THEREWITH

James G. McNally and Joseph B. Dickey, Rochester, N. Y., assignors, by mesne assignments, to Eastman Kodak Company, Jersey City, N. J., a corporation of New Jersey No Drawing. Application August 20, 1936, Serial No. 97,026. Renewed October 19, 1937

19 Claims. (Cl. 8—50)

This invention relates to aromatic azo compounds. More particularly it relates to nuclear non-sulfonated aromatic azo compounds suitable for the coloration of organic derivatives of cellulose. The invention includes the azo compounds, the process for their preparation, the process of coloring with them and materials colored with the azo compounds of the invention.

Organic derivatives of cellulose are characterized by an indifferent affinity for the usual cotton or wool dyes, especially the ordinary water soluble dyes. Typical organic derivatives of cellulose include the hydrolyzed as well as the unhydrolyzed celluose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

We have discovered that the aromatic azo derivatives of 2-imino-3-cyanobarbituric acid constitute a valuable class of compounds. The compounds of our invention have the following probable formula:

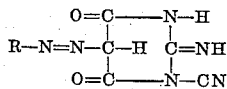

wherein R represents a substituted or unsubstituted aromatic nucleus. Advantageously R is an aryl nucleus of the benzene series.

The nuclear non-sulfonated aromatic azo compounds of our invention may be employed for the dyeing or coloring of materials made of or containing organic derivatives of cellulose, such as the organic acid esters of cellulose, for example. The dyeings produced employing said nuclear non-sulfonated compounds are in general of good fastness to light and washing and range in shade from greenish-yellow to red. The nuclear sulfonated azo compounds are not suitable for the coloration of organic derivatives of cellulose but may be employed for the coloration of cotton, wool, natural silk and regenerated cellulose by the customary methods of application.

The aromatic azo compounds of our invention can be prepared by diazotizing an arylamine and reacting the diazonium salt formed with 2-imino-3-cyanobarbituric acid in an alkaline medium. 2-imino-3-cyanobarbituric acid may be prepared as described in the following example.

*Preparation of 2-imino-3-cyanobarbituric acid*

23 grams of sodium are dissolved in 200 cc. of anhydrous ethanol and 160 grams of ethyl malonate are added following which 46 grams of dicyandiamide are added. The reaction mixture is heated on a steam bath at 80° C. for about 10 hours and the resulting mixture poured into 2500 cc. of cold water and neutralized with dilute hydrochloric acid. The 2-imino-3-cyanobarbituric acid that separates is filtered, washed with water and dried.

The following examples will illustrate the method of preparation of the azo compounds of our invention. Quantities are expressed in parts by weight.

*Example 1*

13.7 parts of ortho-phenetidine are dissolved in 200 parts of water containing about 36 parts of 36% hydrochloric acid. The resulting solution is cooled to a temperature approximating 0–5° C. by the addition of ice, for example, and diazotized by the addition of 6.9 parts of sodium nitrite dissolved in water.

13.8 parts of 2-imino-3-cyanobarbituric acid are dissolved in 300 parts of water containing 31.8 parts of sodium carbonate. The resulting solution is cooled and the diazo solution prepared above is slowly added with stirring. After coupling is complete, the alkaline mixture is made acid to litmus by the addition of acetic acid and the precipitated azo compound is filtered, washed, and dried.

*Example 2*

20.7 parts of 2,6-dichloro-4-nitroaniline are dissolved in 55 parts of 100% sulfuric acid and the resulting solution cooled. This solution is then mixed with a cold solution of 6.9 parts of sodium nitrite in 37 parts of 100% sulfuric acid. The resulting solution is further cooled externally and diluted by the addition of 105 parts of glacial acetic acid and cooled to 15° C. The mixture is stirred several hours until the diazotization is complete after which it is added to a cold solution of 13.8 parts of 2-imino-3-cyanobarbituric acid dissolved in 105 parts of glacial acetic acid. Sodium acetate is then added until the sulfuric acid present is neutralized. When coupling is complete, the desired azo compound is precipitated by the addition of water, filtered, washed and dried.

*Example 3*

16.8 parts of 2-methoxy-4-nitroaniline are suspended in 200 parts of water and 36 parts of 36% hydrochloric acid. The resulting mixture is cooled and diazotized in the usual manner by the addition of 6.9 parts of sodium nitrite dissolved in water.

13.8 parts of 2-imino-3-cyanobarbituric acid are dissolved in 300 parts of water containing 31.8 parts of sodium carbonate. The solution thus prepared is well cooled and the diazo solution prepared above slowly added thereto with stirring. After coupling is complete, the alkaline mixture is made acid to litmus with acetic acid and the precipitated azo compound filtered, washed and dried.

*Example 4*

34.7 parts of disodium 2-amino-naphthalene-4,8-disulfonate are dissolved in 200 parts of water. The resulting solution is well iced and then 59.5 parts of 36% hydrochloric acid are added with vigorous stirring. Diazotization is effected by the gradual addition of a concentrated aqueous solution of 6.9 parts of sodium nitrite.

13.8 parts of 2-imino-3-cyanobarbituric acid are dissolved in 300 parts of water containing 31.8 parts of sodium carbonate and coupled with the diazo solution prepared above. Coupling is effected in a well iced solution by the gradual introduction of the diazo solution. Upon completion of the coupling reaction the desired azo compound is precipitated by the addition of sodium chloride filtered, washed, and dried.

*Example 5*

13.6 parts of p-aminodimethylaniline are dissolved in 200 parts of water containing about 47.6 parts of 36% hydrochloric acid and diazotized in the usual manner by the addition of an aqueous solution of 6.9 parts of sodium nitrite. The diazo solution thus prepared is added slowly to a well stirred iced solution of 13.8 parts of 2-imino-3-cyanobarbituric acid dissolved in 300 parts of water containing 30 parts of sodium carbonate. After about one hour, the mixture is made acid to litmus with acetic acid and the desired azo compound is recovered by filtering, washed and dried.

The following tabulation further illustrates the compounds included within the scope of our invention together with the color they produce on cellulose acetate silk. The compounds indicated below may be prepared in accordance with the procedure above described.

regenerated cellulose, those specifically named producing an orange-yellow shade.

In employing the aromatic azo derivatives of our invention as dyes they will ordinarily be applied to the material in the form of an aqueous suspension which can be prepared by grinding the dye to a paste in the presence of soap or other suitable dispersing agent and dispersing the resulting paste in water. Dyeing operations can, with advantage, be conducted at a temperature of 80-85° C., but any suitable temperature may be employed. In accordance with the usual dyeing practice, the material to be dyed will ordinarily be added to the aqueous dye bath at a temperature lower than that at which the main portion of the dyeing is to be effected, a temperature approximating 45-55° C., for example, following which the temperature of the dye bath will be raised to that selected for carrying out the dyeing operation. The temperature at which the dyeing is conducted will vary somewhat, depending for example, on the particular material or materials undergoing coloration.

It will be understood that the azo compounds of our invention may be applied to the material to be colored in any suitable manner. Coloration may be effected, for example, by dyeing, printing, or stenciling. Dispersing or solubilizing agents that can be employed for preparing suspensions of the dye include soap, sulphoricinoleic acid, salts of sulphoricinoleic acid, and sulfonated oleic, stearic or palmitic acid, or salts thereof such, for instance, as the sodium or ammonium salts.

While it is preferred to effect coloration by applying the dye compound from an aqueous dye bath directly to the material to be colored, the azo compounds of our invention may be applied employing the methods applicable to the so-called ice colors. Briefly, in accordance with this method of dyeing the amine is absorbed and diazotized on the fiber after which the dye is formed in situ by developing with 2-imino-3-cyanobarbituric acid. Conversely the material undergoing dyeing may first be treated to absorb 2-imino-3-cyanobarbituric acid and the dye subsequently formed in situ by coupling with an aryl diazonium salt.

In general the nuclear non-sulfonated azo compounds of our invention also color natural silk and wool but have very little affinity for cotton

| Developer | Amine | Color on cellulose acetate silk |
|---|---|---|
| 2-imino-3-cyanobarbituric acid | o-Anisidine | Greenish yellow. |
| Do | p-Anisidine | Do. |
| Do | o-Nitroaniline | Yellow. |
| Do | p-Nitroaniline | Golden yellow. |
| Do | m-Nitroaniline | Yellow. |
| Do | 2-methoxy-4-nitroaniline | Golden yellow. |
| Do | aniline | Yellow. |
| Do | p-Aminoacetophenone | Do. |
| Do | m-Aminobenzylalcohol | Greenish yellow. |
| Do | o-Chloroaniline | Do. |
| Do | p-Aminodimethylaniline | Red. |
| Do | 2,6-dichloro-4-nitroaniline | Orange yellow. |
| Do | 2-nitro-4-chloroaniline | Do. |
| Do | a-Naphthylamine | Do. |

As a further illustration of the invention, reference may be made to the sulfonated compounds prepared by coupling diazotized 2-aminonaphthalene-4,8-disulfonicacid, diazotized p-nitroaniline-o-sulfonic acid or diazotized 1-amino-4-naphthol-5-sulfonic acid in an alkaline medium with 2-imino-3-cyanobarbituric acid. The sulfonated compounds of the invention may be employed for coloring wool, natural silk, cotton, or viscose fibers. Because of their selective dyeing properties the nuclear non-sulfonated compounds may be employed to produce cross-dyeing effects on fabrics, for example containing an admixture of an organic derivative of cellulose, natural silk or wool with cotton or viscose.

The following example illustrates one satisfactory way in which dyeing may be carried out in accordance with our invention.

Example 6

2.5 parts of the compound formed by coupling 2-imino-3-cyanobarbituric acid with o-anisidine are finely ground with soap and dispersed in 1000 parts of water. The dispersion thus prepared is heated to a temperature approximating 45–55° C. and 100 parts of cellulose acetate silk, in the form of taffeta or threads, for example, are added to the dye bath after which the temperature is gradually raised to 80–85° C. and the silk worked for several hours at this latter temperature. Upon completion of the dyeing operation, the cellulose acetate silk is removed, washed with soap, rinsed and dried. The cellulose acetate silk is dyed a greenish yellow shade.

It will be understood that dyeing operations can be carried out in a manner similar to that described above by the substitution of another organic derivative of cellulose material for cellulose acetate silk or by employing a dye compound of the invention other than that employed in the example, or by substitution of both the material being dyed and the dye compound of the example.

The non-sulfonated aryl azo compounds of our invention possess the advantage of being soluble in organic solvents such as acetone and cellosolve acetate, for example, and may be used to color lacquers, plastic masses and the like. In general, any solvent for cellulose acetate, or more broadly, for lacquer, plastic masses and the like, which is also a solvent for the dye compound, may be used.

We claim:

1. An aromatic azo derivative of 2-imino-3-cyanobarbituric acid.

2. An azo compound having the general formula:

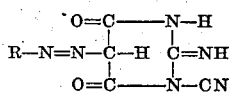

wherein R represents the residue of an aromatic diazo component.

3. An azo compound having the general formula:

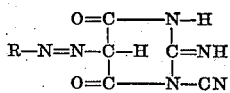

wherein R represents the residue of an aryl diazo component of the benzene series.

4. An azo compound having the general formula:

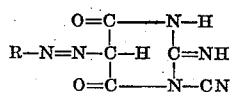

wherein R represents the residue of a nuclear non-sulfonated aromatic diazo component.

5. An azo compound having the general formula:

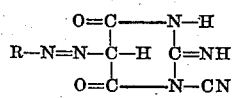

wherein R represents a nuclear non-sulfonated aryl nucleus of the benzene or naphthalene series.

6. An azo compound having the formula:

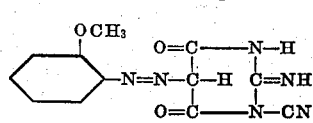

7. An azo compound having the formula:

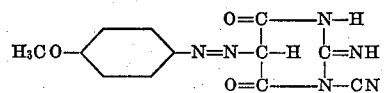

8. An azo compound having the formula:

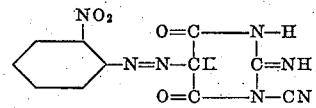

9. A process of coloring organic derivatives of cellulose which comprises applying thereto an azo compound having the general formula:

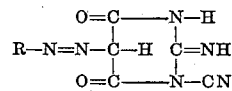

wherein R represents the residue of a nuclear non-sulfonated aromatic diazo component.

10. A process of coloring an organic acid ester of cellulose which comprises applying thereto an azo compound having the general formula:

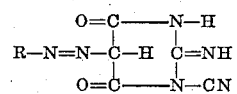

wherein R represents the residue of a nuclear non-sulfonated aromatic diazo component.

11. A process of coloring an organic acid ester of cellulose which comprises applying thereto an azo compound having the general formula:

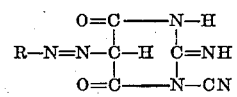

wherein R represents a nuclear non-sulfonated aryl nucleus of the benzene series.

12. A process of coloring a cellulose acetate which comprises applying thereto an azo compound having the general formula:

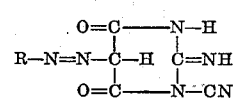

wherein R represents the residue of a nuclear non-sulfonated aromatic diazo component.

13. A process of coloring a cellulose acetate which comprises applying thereto an azo compound having the general formula:

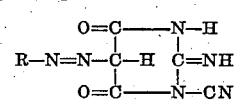

wherein R represents a nuclear non-sulfonated aryl nucleus of the benzene series.

14. Material containing an organic derivative of cellulose colored with an azo compound having the general formula:

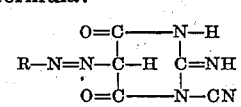

wherein R represents the residue of an aromatic diazo component.

15. Material containing an organic acid ester of cellulose colored with an azo compound having the general formula:

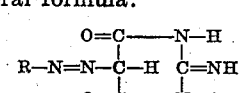

wherein R represents the residue of an aromatic diazo component.

16. Material containing an organic acid ester of cellulose colored with an azo compound having the general formula:

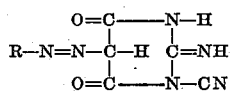

wherein R represents a nuclear non-sulfonated aryl nucleus of the benzene series.

17. A cellulose acetate colored with an azo compound having the general formula:

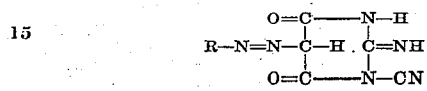

wherein R represents the residue of an aromatic diazo component.

18. A cellulose acetate colored with an azo compound having the general formula:

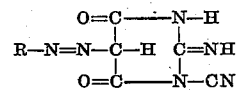

wherein R represents a nuclear non-sulfonated aryl nucleus of the benzene series.

19. An azo compound prepared by coupling a diazotized aromatic amine with 2-imino-3-cyanobarbituric acid in an alkaline medium.

JAMES G. McNALLY.
JOSEPH B. DICKEY.